R. K. DAVIS AND W. J. SCHAFFER
METAL WORKING MACHINE.
APPLICATION FILED MAR. 9, 1920.
1,435,453.
Patented Nov. 14, 1922.
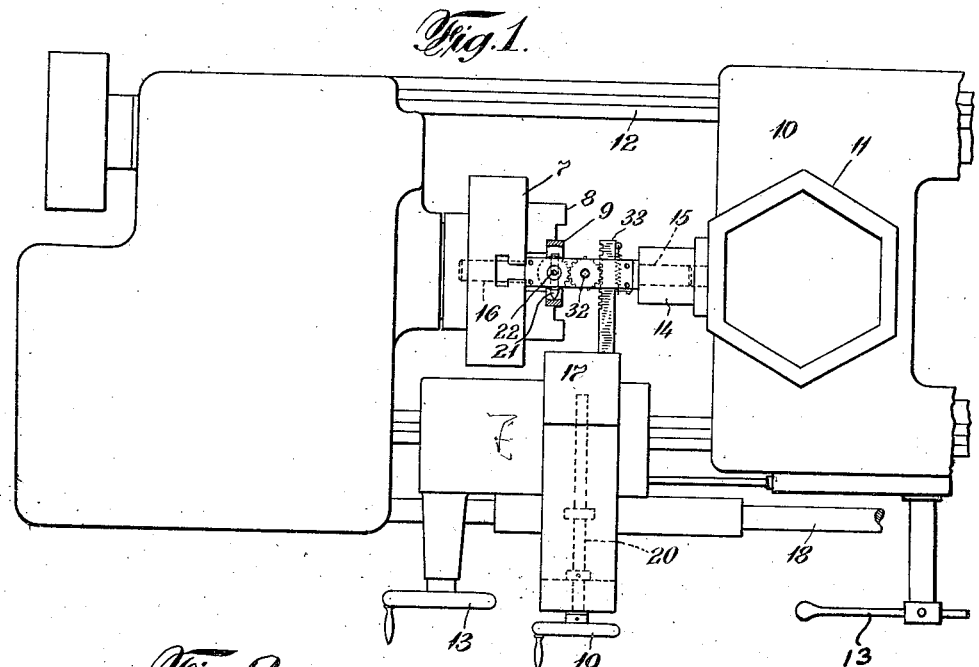
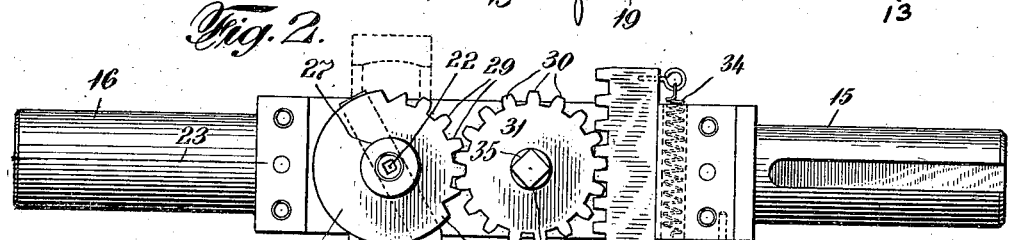
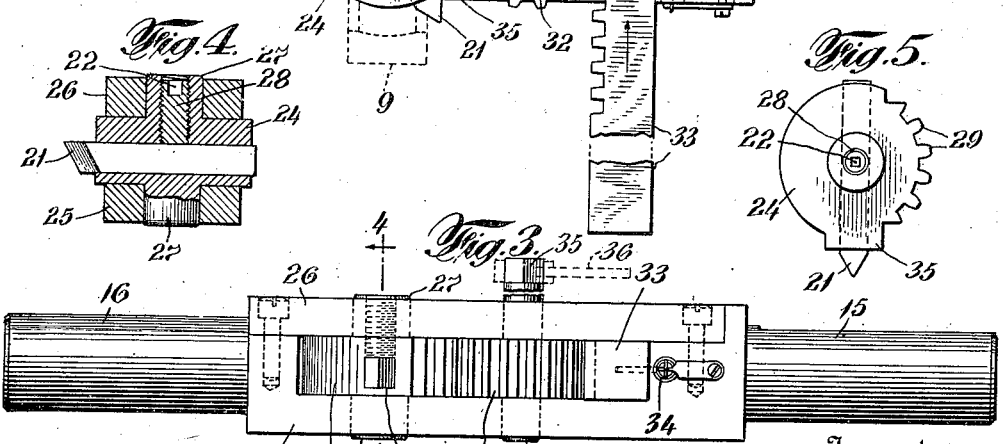
Inventor
Russell K. Davis
and William J. Schaffer
By their Attorneys
Rogers, Kennedy & Campbell Patented Nov. 14, 1922.

1,435,453

UNITED STATES PATENT OFFICE.

RUSSELL K. DAVIS AND WILLIAM J. SCHAFFER, OF HARTFORD, CONNECTICUT, ASSIGNORS TO SKAYEF BALL BEARING COMPANY, A CORPORATION OF CONNECTICUT.

METAL-WORKING MACHINE.

Application filed March 9, 1920. Serial No. 364,562.

*To all whom it may concern:*

Be it known that we, RUSSELL K. DAVIS and WILLIAM J. SCHAFFER, both citizens of the United States, residing at Hartford, in the county of Hartford and State of Connecticut, have invented certain new and useful Improvements in Metal-Working Machines, of which the following is a specification, reference being had therein to the accompanying drawing.

This invention relates to metal working machinery and is peculiarly adapted for use as a fixture for the turret lathe. An object of the invention is to provide means for angularly moving a cutter independently of the movement of the work piece. A further object of the invention is to provide an angularly movable cutter which is capable of acting upon the interior of a work piece, and for shaping the bore of such piece by forming a groove therein, which groove in cross section is struck on an arc, and if desired such arc may have its center at the center of the work piece whereby the cut will be the segment of a sphere. In a practicable embodiment of the invention the cutter is mounted on the boring bar or pilot bar of the turret and is associated with actuating mechanism for engagement with a cross feed tool slide.

In the drawings accompanying this specification an embodiment of the invention is illustrated, in which drawings:

Figure 1 is a top view of a turret lathe equipped with our improvement, the work piece being shown in horizontal section.

Fig. 2 is a top view of the fixture removed from the lathe, the top plate of the housing being removed.

Fig. 3 is an elevation of the structure illustrated in Fig. 2.

Fig. 4 is a section taken on a plane at about the line 4—4 of Fig. 3, and

Fig. 5 is a top view of an interchangeable tool holder or carrier removed from the fixture.

The form of lathe illustrated is provided with a suitable chuck 7 having jaws 8 for carrying a work piece as 9. A turret slide 10, having a turret 11 thereon, is movable toward and from the chuck upon suitable ways, 12. This movement, as is well known, is automatic, and is also capable of being effected by means of a suitable manually operated device, as for instance a hand wheel 13. The turrets in practice are provided with suitable bar carrying members or sockets as 14. In the present illustration the boring bar is provided with an end 15, for insertion in the socket and a pilot end 16 for passing into the chuck body 7 and therein engaging some suitable steady rest or bushing. The lathe is also shown provided with a well known form of tool rest slide 17, which is movable crosswise of the ways 12, such movement being effected either automatically from the shaft 18, which is also utilized to effect the automatic traverse of the current slide 10, but may be moved manually as for instance by means of a hand wheel 19 acting upon the cross feed screw 20.

The construction and operation of the mechanism above described are well known, and are availed of for actuating and controlling the angularly movable cutter and effecting this by their usual and normal actions. The operative parts of our invention are preferably mounted upon the median portion of the boring or pilot bar between the ends 15, 16. The parts are so constructed, organized and related that the traverse of the turret brings the cutter into initial position for inaugurating its work and steadies the tool while it is at work. The tool slide by its cross feed, actuates the cutter and causes this to swing through the work at a predetermined speed upon a predetermined radius. In the form of attachment illustrated the tool 21 is mounted to turn on an axis represented at 22 which is perpendicular to the longitudinal axis, 23, of the boring bar, such axis 23 coinciding with the axis of rotation of the chuck 7. The tool holder 24 is shown in the form of a disc mounted in a housing formed in the center portion of the boring or pilot bar, the housing having a rectangular frame work, there being a center or base plate 25 integral with the ends 15 and 16 and a removable top plate 26. These plates form bearings for the various parts. The tool holder is shown provided with hubs 27 which are mounted in suitable openings in the plates 25 and 26. One of the hubs is shown provided with a tapped hole for receiving a set screw 28 which permits of the adjustment, in and out, of the cutter or tool 21. Such adjustment may be either for the purpose of compensating for wear or changing the radius of the cut.

The tool holder 24 is provided with gear teeth 29 which mesh with gear teeth 30 formed on a somewhat similar wheel or disc 31 having trunnions 32 also mounted in suitable openings in the plates 25 and 26. The teeth of a rack bar 33 are shown meshing with the teeth 30 of this gear wheel. A reciprocation of the rack effects the oscillation of the cutter 21. The back edge of the rack bar engages a suitably formed face at the end of the rectangular housing, and its top and bottom faces engage the inner sides of the plates 25 and 26.

The excursion of the rack bar 33, or movement in the direction of the arrow in Fig. 2, causes the cutting or working movement of the tool 21 and is produced by the forward feed of the cross slide. The recessional movement of this rack bar is effected in the present illustration by means of a suitable extension spring 34.

The various parts of the device and particularly the tool holder 24 are interchangeable. Of course, the fixture, as a whole, is interchangeable from one lathe to another, and the tool holders are interchangeable for various reasons particularly that of increasing the range of work sizes. As is well known if the working end of the tool 21 extends too far out of its socket there will be a vibration or chattering. A considerable range of tool movement is permissible, but to admit of adjustment beyond this permissible range there is provided with each attachment a plurality of tool holders having the forward part 35 of the socket forming portion of the holder located at different radial distances from the axis 22. By reference to Fig. 5 and comparing this with Fig. 2, it will be seen that the portion 35 just referred to extends farther than does the similar portion in Fig. 2. Sufficient metal will be added with increments of radius.

The operation of the fixture is substantially as follows: The parts are properly assembled in position and the tool properly sharpened. The portion 15 of the bar is placed and locked in its socket, the turret with its slide occupying a withdrawn position, in the illustration being backed off toward the right hand side. The work piece 9 is placed in the chuck jaws 8, which bring the center of the work piece, assuming it to be annular, in coincidence with the axis 23. The tool slide carriage 20 is withdrawn to such a position that the rear end of the rack bar 33 can clear the front end of the slide 17. The turret is then advanced, either automatically through the parts associated with the feed device 18 or by means of the hand wheel 13, until the end of the rack bar 33 is in the path of movement of the tool slide. The tool slide is then brought, preferably by the actuation of the hand wheel, up so that its front end engages the end of the bar 33. The turret is then advanced to its fixed limit which is so regulated that the axis 22 of the cutter is located in the plane of the work piece 9, which shall constitute the center of the groove to be cut in the work piece, whereupon the turret slide is held in position in the well known manner and the tool slide is released to the automatic cross feed of the screw 20 and actuating device 18. This automatic cross feed action presses the rack bar 33 forward thereby rotating the gear wheel 31, and through which the disc 24, which in a certain aspect is a gear wheel, thus swinging the point of the cutter 21 through an arc of a circle and causing it to cut or form in the bore of the work piece, a groove which is the arc of a circle in cross section, and with the parts as herein illustrated the segment of a sphere. During the cutting operation, the pilot end 16 of the bar, having entered the proper bushing or socket provided for it, steadies the tool.

At times it is desirable to manually oscillate the tool and its tool holder. A convenient means for accomplishing this is shown. The upper trunnion of the gear wheel 31 is extended into a post 35 of angular cross section for receiving a suitable handle, 36.

It is to be understood that the disclosure in the description and drawings is intended to be illustrative of the invention and that changes in details of construction may be resorted to as occasion demands to meet the requirements of various forms of machine tools with which the fixture will be employed, as well as to meet the requirements of the various forms and locations of grooves which it is desired to produce in the work piece.

We claim as our invention:

1. The combination with a rotary chuck, a carrier movable toward and from the same in a path parallel with the axis of rotation thereof, and a slide movable transversely thereof, of an oscillatory tool holder, a supporting member carried by the carrier and upon which the tool holder is pivotally mounted, and a reciprocatory actuator associated with the tool holder for oscillating the same, the parts being so organized and located that the traverse of the carrier is effective to place the tool holder into working relation with a work piece carried by the chuck and to place the actuator in the path of movement of the slide.

2. The combination with a rotary chuck, a carrier movable toward and from the same in a path parallel with the axis of rotation thereof, and a slide movable transversely thereof, of an oscillatory tool holder provided with gear teeth, a supporting member carried by the carrier and upon which the tool holder is pivotally mounted, and a reciprocatory rack bar in mesh with the gear teeth of the tool holder for oscillating the same, the parts being so organized and located that the traverse of the carrier is effective to place the tool holder into working relation with the work piece carried by the chuck and to place the rack bar in the path of movement of the slide.

3. The combination with a rotary chuck, a carrier movable toward and from the same in a path parallel with the axis of rotation thereof, and a slide movable transversely thereof, of an oscillatory tool holder provided with gear teeth, a supporting member carried by the carrier and upon which the tool holder is pivotally mounted, a reciprocatory rack bar in mesh with the gear teeth of the tool holder for oscillating the same, and an extension spring for returning the rack bar, the parts being so organized and located that the traverse of the carrier is effective to place the tool holder into working relation with a work piece carried by the chuck and to place the actuator in the path of movement of the slide and the traverse of the slide effects the excursion of the rack bar and extends the spring.

4. The combination with a rotary chuck, a carrier movable toward and from the same in a path parallel with the axis of rotation thereof, and a slide movable transversely thereof, of an oscillatory tool holder, a supporting member interchangeably carried by the carrier and upon which the tool holder is pivotally interchangeably mounted, a reciprocatory actuator associated with the tool holder for oscillating the same, the parts being so organized and located that the traverse of the carrier is effective to place the tool holder into working relation with a work piece carried by the chuck and to place the actuator in the path of movement of the slide.

5. The combination with a rotary chuck, a turret movable toward and from the same in a path parallel with the axis of rotation thereof, and a cross slide rest movable transversely thereof, of an oscillatory tool holder provided with gear teeth, a boring bar interchangeably carried by the turret and upon which the tool holder is pivotally mounted, a reciprocatory rack bar in mesh with the gear teeth of the tool holder for oscillating the same.

6. In a turret lathe having a chuck, longitudinal ways, a turret movable thereon, and a cross slide movable transversely thereof, of a boring bar carried by the turret, an oscillatory tool holder pivotally mounted on the boring bar, and a reciprocatory actuator associated with the tool holder for oscillating the same, the parts being so organized and located that the traverse of the turret is effective to brace the tool holder into working relation with a work piece carried by the chuck and to place the actuator in the path of movement of the cross slide.

7. The combination of a rotary chuck to hold an annular work piece with its bore exposed, a relatively fixed supporting member, a tool holder mounted on the supporting member to oscillate thereon and provided with a tool in position to act on the bore of the work piece, a tool holder actuator sustained on the supporting member and movable relatively thereto transversely of the axis of rotation of the work, said actuator being operatively connected with the tool holder to oscillate the same, and means for moving the actuator relatively to the supporting member.

8. The combination with an oscillatory tool holder of a supporting member in the nature of a boring bar for a turret lathe upon which the tool holder is pivotally and interchangeably mounted, and a reciprocatory actuator mounted on the supporting member for oscillating the tool holder.

9. The combination with an oscillatory tool holder provided with gear teeth, a supporting member in the nature of a boring bar upon which the tool holder is pivotally mounted, and a reciprocatory rack bar in mesh with the gear teeth of the tool holder for oscillating the same.

10. The combination with a rotary chuck, of a boring bar having a pilot portion adapted to enter the chuck, an oscillatory tool holder pivotally mounted on the boring bar, an adjustable stop for locating the tool holder in working relation to the chuck, a reciprocatory actuator associated with the tool holder for oscillating the same, and a member movable toward and from the tool holder when located by the stop as aforesaid and adapted to actively engage the said actuator.

In testimony whereof, we have affixed our signatures hereto.

RUSSELL K. DAVIS.
WILLIAM J. SCHAFFER.